UNITED STATES PATENT OFFICE.

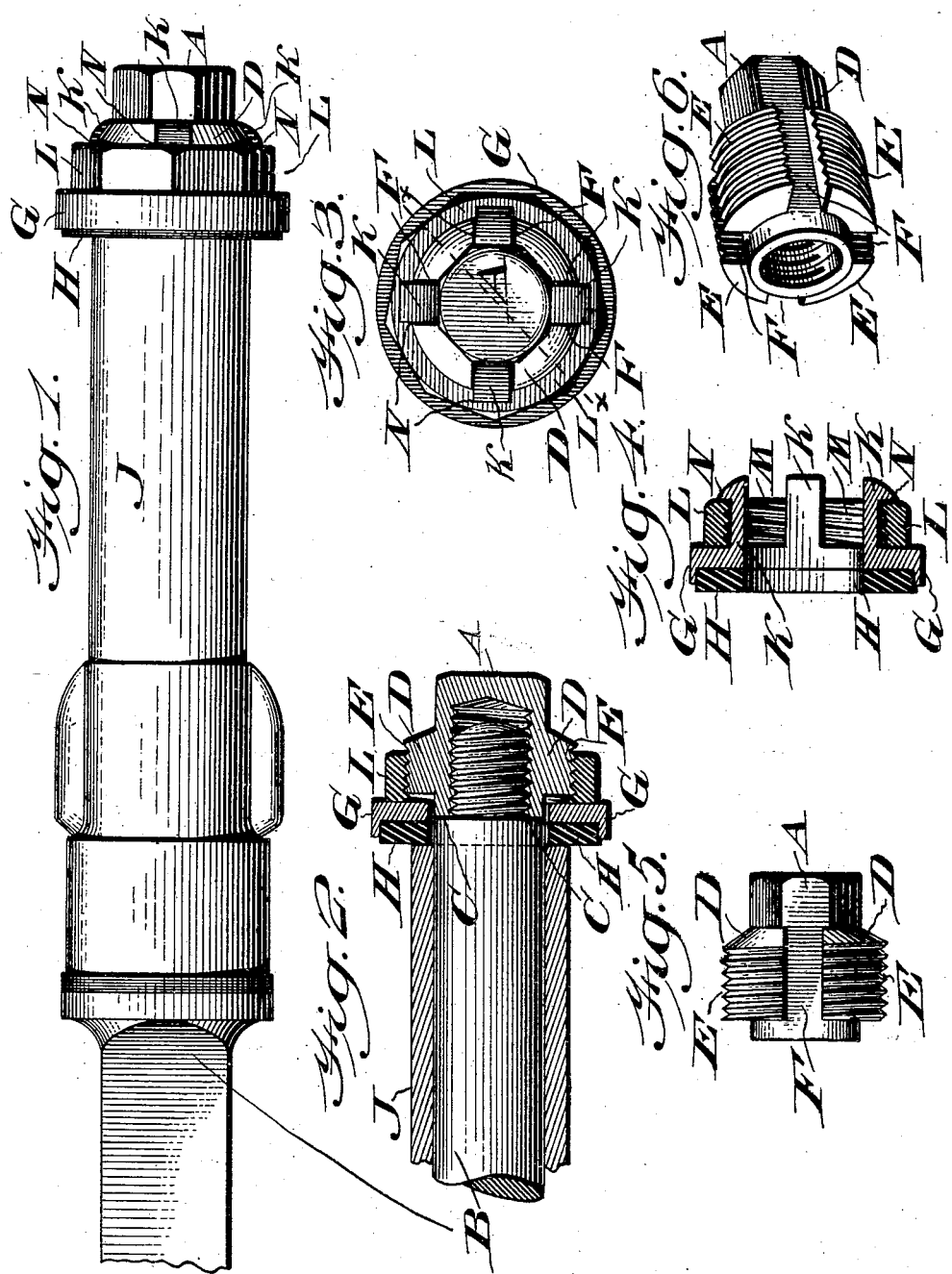

JOSEPH B. WISMER, OF FRANCONIA, PENNSYLVANIA.

AXLE-NUT.

977,246.  Specification of Letters Patent.  Patented Nov. 29, 1910.

Application filed June 15, 1909. Serial No. 502,216.

*To all whom it may concern:*

Be it known that I, JOSEPH B. WISMER, a citizen of the United States, residing at Franconia, Montgomery county, State of Pennsylvania, have invented a new and useful Axle-Nut, of which the following is a specification.

My invention consists of an axle-nut embodying a nut attachable to an axle, a collar freely mounted on said nut, and means on a member of said collar having means for connection with said nut, whereby the collar may be moved to be fitted tightly against the hub box of a wheel and so provide for lost motion, wear and tear, and prevent rattling of said box on the axle.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a side elevation of an axle nut embodying my invention, including a wheel box and a portion of the axle for the latter. Fig. 2 represents a longitudinal section of a portion of the wheel box and the nut, with a portion of the axle in elevation. Fig. 3 represents a front end view of Fig. 1. Fig. 4 represents a section on the line $x$—$x$ of Fig. 2 with the nut removed. Fig. 5 represents a side elevation of a detached portion. Fig. 6 represents a perspective view of said portion looking at the inner side thereof.

Similar letters of reference indicate corresponding parts in the figures.

Referring to the drawing:—A designates a nut which is adapted to be screwed upon the end of the axle B and tighten against the shoulder C thereon. On the exterior of said nut are raised segments D, whose outer surfaces have sections of screw-threads E thereon, said segments being separated by the passages F, which with the segments D extend in the longitudinal direction of the nut, said segments being set back from the inner end of the nut, so as to leave an unthreaded neck at said end. G designates a collar, which freely encircles the said neck on the inner end portion of the nut A and contains the washer H, which latter is adapted to fit closely against the end of the hub-box J. Projecting laterally outward from said collar are the spaced-apart arms K, which are adapted to occupy freely the passages F of the nut A and thus surround the latter. Encircling said arms is the ring or sleeve L, which is interiorly-threaded as at M and adapted to engage the threads of the segments D, said sleeve being adapted to ride freely on said arms K, which latter are unthreaded, said sleeve being retained in position on one side by the collar G, and on the other side by the shoulders N on the outer end portions of said arms, so that it is swiveled on the arms as most plainly shown in Fig. 4.

The operation is as follows:—The nut is screwed in position as usual, as hereinbefore stated, and the sleeve L carried by said nut has the washer contacting with the end of the box, but said sleeve may be rotated independently of the nut to cause said washer to press more tightly against said box, this being occasioned by its threads engaging with those of the segments E, thus making a tight joint at the contiguous parts of the washer and box. As said collar G is moved forward by the sleeve L, the arms K slide in the passages F as guides and so prevents rotation of the collar, while the latter is advanced against the box. As the contacting portions of the collar and box may wear away, the sleeve L is further rotated, and thus the washer is advanced to a greater extent, whereby it again makes a close joint with the box, providing for lost motion of the latter and preventing rattling of the same and consequently of the wheel on the axle.

Having thus described my invention, what I claim as new and desire to secure by Letters Patent, is:—

1. A nut having thereon threaded segments with longitudinally extending passages therebetween and a reduced inner end beyond said segments and passages, a non-rotatable collar on said reduced inner end of said nut and provided with arms slidably occupying said passages and having shoulders at their outer ends, an interiorly threaded rotatable sleeve encircling said segments and arms and having threaded engagement with the threads of said segments and freely ridable over said arms and confined between said shoulders and collar, said collar being flanged, and a washer received within said flange and extended beyond the inner face thereof, said sleeve being swiveled on said arms.

2. A nut having thereon threaded segments with longitudinally extending passages therebetween and a reduced inner end beyond said segments and passages, a non-rotatable collar on said reduced inner end of said nut and provided with arms slidably occupying said passages and having shoulders at their outer ends, an interiorly threaded rotatable sleeve encircling said segments and arms and having threaded engagement with the threads of said segments and freely ridable over said arms and confined between said shoulders and collar, said collar being flanged, and a washer received within said flange and extended beyond the inner face thereof, said sleeve being swiveled on said arms, said reduced inner end being unthreaded, and the sleeve being held out of contact with said arms and bearing against said collar and holding the same out of contact with the shoulder formed by the inner ends of said segments.

3. A nut having thereon threaded segments with longitudinally extending passages therebetween and a reduced inner end, a non-rotatable collar on said reduced inner end of said nut provided with arms slidably occupying said passages and having shoulders at their outer ends, said reduced inner end being unthreaded and an interiorly threaded rotatable sleeve encircling said segments and arms and engageable with the threads of the segments and freely ridable over said arms out of contact with said unthreaded inner end and confined between said shoulders and collar.

JOSEPH B. WISMER.

Witnesses:
REUBEN HANGEY,
B. D. ALDERFER.